United States Patent [19]
Wober et al.

[11] Patent Number: 5,729,631
[45] Date of Patent: Mar. 17, 1998

[54] IMAGE NOISE REDUCTION SYSTEM USING A WIENER VARIANT FILTER IN A PYRAMID IMAGE REPRESENTATION

[75] Inventors: Munib A. Wober, Haverhill; Yibing Yang, Arlington; Ibrahim Hajjahmad, Malden; Lon E. Sunshine, Boston; Michael L. Reisch, Carlisle, all of Mass.

[73] Assignee: Polaroid Corporation, Cambridge, Mass.

[21] Appl. No.: 440,639

[22] Filed: May 15, 1995

Related U.S. Application Data

[63] Continuation-in-part of Ser. No. 159,795, Nov. 30, 1993, abandoned.

[51] Int. Cl.$^6$ .................................................. G60K 9/36
[52] U.S. Cl. .................................................. 382/232
[58] Field of Search ................................ 382/232, 250, 382/260, 270, 275, 276, 283

[56] References Cited

U.S. PATENT DOCUMENTS

| | | | |
|---|---|---|---|
| 4,209,780 | 6/1980 | Fenimore et al. | 382/128 |
| 4,536,887 | 8/1985 | Kaneda et al. | 381/92 |
| 4,947,328 | 8/1990 | Smith | 382/128 |
| 5,126,962 | 6/1992 | Chiang | 364/725 |
| 5,184,316 | 2/1993 | Sugiyama | 364/715.02 |
| 5,327,242 | 7/1994 | Naimpally et al. | 340/606 |
| 5,337,180 | 8/1994 | Woods et al. | 359/568 |
| 5,414,782 | 5/1995 | Carasso | 382/270 |
| 5,500,685 | 3/1996 | Kokaram | 348/620 |
| 5,523,568 | 6/1996 | Ichikawa et al. | 250/310 |
| 5,550,935 | 8/1996 | Erdem et al. | 382/260 |

FOREIGN PATENT DOCUMENTS

| | | | |
|---|---|---|---|
| 0574969 | 12/1993 | European Pat. Off. | G06F 15/68 |
| WO89/07799 | 8/1989 | WIPO | G06F 15/332 |

OTHER PUBLICATIONS

"Two–Dimensional Signal and Image Processing" by Jae S. Lim, 1990 Prentice–Hall Inc., pp. 527–567.

*Primary Examiner*—Jose L. Couso
*Attorney, Agent, or Firm*—Robert A. Sabourin

[57] ABSTRACT

The invention relates to a novel process and system for removing noise from an image by first noise modeling an image signal source to generate noise masks and LUT values characteristic of noise at different frequency levels for each channel, and then applying the stored noise masks and LUT values to an image signal for noise removal. The image is first captured as an electronic image signal by the image signal source, then represented by a pyramid structure whereby each successive level of the pyramid is constructed from DC values of the previous level, and each level of the pyramid corresponds to a different frequency band of the image signal. A Wiener variant filter using DCT transforms is used to filter DCT coefficients at each level. The image is restored with reduced noise by replacing DC values with next level IDCT coefficients then performing an IDCT on the results.

9 Claims, 10 Drawing Sheets

IMAGE NOISE REDUCTION SYSTEM USING A WIENER VARIANT FILTER IN A PYRAMID IMAGE REPRESENTATION

RELATED APPLICATIONS

This application is a continuation-in-part of parent U.S. patent application Ser. No. 08/159,795 filed 30 Nov. 1993 now abandoned by Munib A. Wober and Michael L. Reisch. Furthermore, this application is related to concurrently filed and commonly assigned U.S. patent application Ser. Nos. 08/440,666 pending, patent application Ser. No. 08/440,651 pending, patent application Ser. No. 08/440,631 pending patent application Ser. No. 08/441,000 allowed, patent application Ser. No. 08/440,647 allowed, patent application Ser. No. 08/441,372 allowed and patent application Ser. No. 08/441,383 pending.

FIELD OF THE INVENTION

This invention relates generally to improved methods and apparatus for image processing. More particularly, the invention relates to novel processes and systems for removing noise from an image by using discrete cosine transforms (DCT) in a multi-level pyramid image representation.

BACKGROUND OF THE INVENTION

The prior art literature is replete with methods and devices for removing artifacts from an image which is acquired, processed and restored. The general case of image restoration concerns an image which has been degraded in some manner whereby the objective is to reduce or eliminate the degradation.

Typically, a captured image includes noise inherent in an image signal source, e.g. a camera, scanner, charge-coupled device (CCD), charge-injected device (CID), or the like. Equation (1) mathematically expresses a degraded image or noisy signal $x(n_1,n_2)$ as the addition of noise $v(n_1,n_2)$ to the original signal $s(n_1,n_2)$, as modeled in FIG. 3A.

$$x(n_1,n_2)=s(n_1,n_2)+v(n_1,n_2) \quad (1)$$

If $v(n_1,n_2)$ is a function of the signal $s(n_1,n_2)$, then $x(n_1,n_2)$ is additive random signal dependent noise (hereinafter "signal dependent noise"), otherwise if $v(n_1,n_2)$ is not dependent upon $s(n_1,n_2)$, then $x(n_1,n_2)$ is additive random signal independent noise (hereinafter "additive noise"). Each of the signals $x(n_1,n_2)$, $s(n_1,n_2)$ and $v(n_1,n_2)$ represents a physical electronic signal, i.e. a waveform of voltages having amplitudes and frequencies related as a function of time.

Examples of signal dependent noise are film grain noise, speckle noise and quantization noise. Signal dependent noise, which is much more difficult to reduce than additive noise, can be reduced by first transforming the noisy signal $x(n_1,n_2)$ into a domain where the noise becomes signal independent, then removing the signal independent noise using a conventional method such as Wiener filtering. Signal dependent noise can also be reduced directly in the spatial domain.

One approach to removing additive noise is disclosed in U.S. Pat. No. 5,337,180 issued 9 Aug. 1994 to Woods et at. which describes optical signal dependent noise reduction by variable spatial thresholding of the fourier transform. Another approach to removing additive noise is disclosed in U.S. Pat. No. 5,327,242 issued 5 Jul. 1994 to Naimpally et at. which describes the reduction of a noise component of a video signal using a three dimensional discrete cosine transform to determine the time frequency spectrum of both the video signal and the noise component, subtracting the time frequency spectrum of the noise component from the time frequency spectrum of the video signal, and converting the time frequency spectrum of the modified video signal back to the spatial domain by using an inverse three dimensional discrete cosine transform.

A book entitled "Two-Dimensional Signal and Image Processing" by Jae S. Lim, 1990 Prentice-Hall Inc., pp. 527–549, describes additional methods for reducing additive noise, including Wiener filtering and adaptive image processing. Reduction of signal dependent noise is also described on pages 562–567 for processing the noisy signal directly in the signal domain or by first transforming the noisy signal into the signal domain, then processing for noise reduction. The above pages of the Lim book are herein incorporated by reference in their entirety for background information concerning noise reduction as understood by those of ordinary skill in the art.

It is a primary object of this invention to provide improved systems and methods for noise modeling of an image signal source and subsequent image restoration by noise removal.

Other objects of the invention will, in part, appear hereinafter and, in part, be obvious when the following detailed description is read in conjunction with the drawings.

SUMMARY OF THE INVENTION

The invention relates to a novel process and system for removing noise from an image represented by an image signal by first noise modeling an image signal source to generate both noise masks and lookup table (LUT) values characteristic of noise present at various frequency levels within each channel, and then applying the noise masks and LUT values to the image signal for noise removal. The image is first captured as an electronic image signal by the image signal source, then represented by a pyramid image representation whereby each successive level of the pyramid is constructed from direct current (DC) values of the previous level, and each level of the pyramid corresponds to a different frequency band of the image signal. A Wiener variant filter using DCT transforms is used to filter DCT coefficients at each level. The image is restored with reduced noise by replacing DC values with next level inverse discrete cosine transform (IDCT) coefficients, then performing an IDCT on the results.

DETAILED DESCRIPTION OF THE PREFERRED EMBODIMENTS

Figure 1:
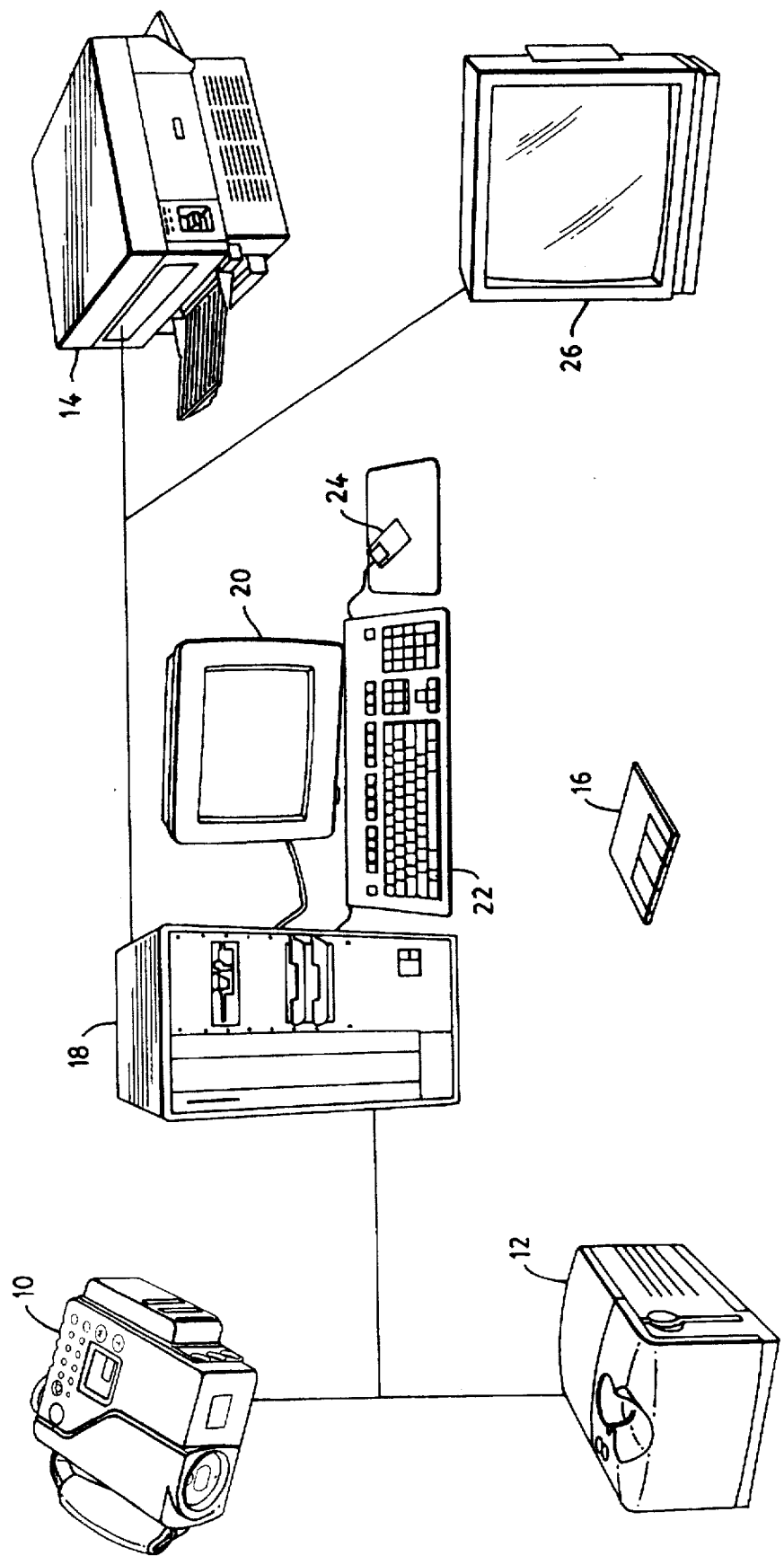
FIG. 1 is a block diagram of a preferred embodiment of an electronic imaging system for both noise modeling and noise removal according to the invention.

The present invention is directed towards improved noise modeling and filtering systems for reducing both additive and signal dependent noise from a noisy image signal. FIG. 1 illustrates one exemplary embodiment of such a system. As can be seen, FIG. 1 illustrates an electronic image processing system where an image signal source, such as an electronic still camera 10 or a scanner 12, provides an electronic image signal which represents an image of a subject (not shown). A computer 18 receives the electronic signal from the image signal source and thereafter processes the image signal electronically to provide any number of known image processing functions. The processed image is then transmitted, i.e. output, to a destination device or destination application such as a diskette 16, an user monitor 20, a printer 14, or a remote monitor 26. Operator interaction with the system is facilitated by use of a keyboard 22 or a mouse 24. Of course, the components shown in FIG. 1 are merely exemplary rather than all inclusive of the many equivalent devices known by those skilled in the art. For instance, the image signal source could include any device which acts as an image signal source such as an electronic camera, a scanner, a camcorder, a charge coupled device (CCD), a charge injected device (CID), etc. Also, it is noteworthy that the processing of the image need not necessarily occur solely in the computer 18. Indeed, various phases or aspects of the image processing could occur in the image signal source, the computer, or the destination output device.

The hardware of a noise removal system according to the invention includes a discrete cosine transform processor and a Wiener filter combined for removing all frequencies of noise from an image. In order to fully appreciate the details involving the combination of steps and components of the claimed invention, the following explanations on discrete cosine transform mathematics and Wiener noise filtering will be helpful.

1. DCT Mathematics

Images can be thought of as two-dimensional representations of some visual reality that is distributed in space and/or time. Ordinarily, they are what the human visual system perceives as variations in external stimuli such as brightness, color, and sometimes depth cues. While over the years any number of techniques have been developed to capture and reproduce images, their representation as continuous, discrete, or digital signals which can be manipulated, processed or displayed through the use of computers or other special purpose electronic hardware is the most recent technique, now well-established, which has a variety of beneficial applications.

Image processing can occur in either the spatial domain or the frequency domain. An image is said to reside in the spatial domain when the values of the parameters used to describe it, such as brightness, have a direct correspondence with spatial location. In the frequency domain, the image in the spatial domain may be represented by a series of frequency components in the form of trigonometric functions which, when summed for each image data point (i.e., pixel) yield the value of the parameter used to characterize the image of that point in the spatial domain, and such a representation may be extended to cover all points of an image.

In the spatial domain, original image data may be conveniently represented as image data points in a first spatial matrix designated, $s(j,i)$, for a two-dimensional case where the lower case, s, designates the spatial domain, i is the index of rows and j is the index of columns. In the frequency domain, matrices can also be used to mathematically describe an image as a set of the transform coefficients (also referred to as frequency coefficients) which represent frequency data in a transform matrix conventionally designated, $S(v,u)$, where the upper case, S, designates the frequency domain and, u is the index of rows and v is the index of columns.

Spatial image data points may be transformed to frequency space using transformations such as Fourier transforms or discrete even cosine transforms. When the transformation involved is a discrete cosine transformation, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete even cosine transformation is defined as a transform that maps an image from the original image data points $s(j,i)$ in the spatial domain to DCT coefficients $S(v,u)$ in the DCT domain according to the basis function of the forward DCT, whereas an inverse discrete even cosine transformation (or IDCT) is defined as a transform that maps the DCT coefficients $S(v,u)$ from the DCT domain to reconstructed image data points $\hat{s}(j,i)$ in the spatial domain according to the basis function of the IDCT.

An image is typically made up of a two-dimensional P×Q array of descriptors called pixels or image data points, where P is the number of rows and Q is the number of columns representing the image. The image can be represented by either image data points in the spatial domain, or by corresponding DCT coefficients in the frequency domain. A forward DCT generates the DCT coefficients by taking a discrete even cosine transformation of the image data points. Conversely, an inverse discrete even cosine transformation generates the IDCT coefficients (i.e. reconstructed image data points) by taking an inverse discrete even cosine transformation of the DCT coefficients.

A DCT transformation can occur in any number of dimensions as understood by those skilled in the art. In the following one-dimensional example, a row (more generically referred to as a segment) of N image data points $s(j)$ can be transformed from the spatial domain to corresponding DCT coefficients $S(v)$ in the frequency domain in accordance with equation (2).

$$S(v) = C_v \sqrt{\frac{2}{N}} \sum_{j=0}^{N-1} s(j) \cos \frac{(2j+1)v\pi}{2N} \quad (2)$$

where:

$0 \leq v \leq (N-1)$, v an integer;

s(j) represents the matrix of image data points in the segment;

S(v) represents the corresponding matrix of DCT coefficients;

N represents the number of image data points in the segment;

$$C_v = \frac{1}{\sqrt{2}} \text{ for } v = 0; \text{ and}$$

$C_v = 1$ for $v \neq 0$.

The DCT coefficients S(v) are determined from equation (2) where the normalized cosine basis terms are derived for a segment having N image data points. The value for S(0) is determined for v=0 by summing each of the image data points s(j) for $0 \leq j \leq (N-1)$ times the cosine terms of the basis function. The value for S(1) is determined as the summation of image data points s(j) times the cosine terms for v=1. This procedure, which indexes first on v and then on j, is repeated for derivation of DCT coefficients S(0) through S(N-1).

A modified inverse discrete cosine transformation is mathematically defined in equation (3) where the one-dimensional matrix S(v) of DCT coefficients is transformed to a reconstructed matrix ŝ(y) of reconstructed image data points, and y is defined as a real number within the given range as disclosed and explained in U.S. patent application Ser. No. 08/159,795 filed 30 Nov. 1993 now abandoned by Wober and Reisch.

$$\hat{s}(y) = \sqrt{\frac{2}{N}} \sum_{v=0}^{N-1} C_v S(v) \cos \frac{(2y+1)v\pi}{2N} \quad (3)$$

where:

$0 \leq y \leq (N-1)$, y a real number;

S(v) represents the matrix of DCT coefficients;

ŝ(y) represents the spatial matrix of reconstructed image data points;

N represents the number of image data points in the segment;

$$C_v = \frac{1}{\sqrt{2}} \text{ for } v = 0; \text{ and}$$

$C_v = 1$ for $v \neq 0$.

If the DCT coefficients S(v) of equation (2) are computed from a set of image data points s(j) and the reconstructed image data points ŝ(y) of equation (3) are computed from the corresponding DCT coefficients S(v), then s(j)≡ŝ(y) when y=j, and the process is referred to as invertible or one-to-one mapping since the reconstructed image data points of ŝ(y) are identical, within limits, to the original image data points of s(j). By evaluating y in equation (3) at other (non-integer) values where $0 \leq y \leq (N-1)$, a modified IDCT is obtained which can be used for various processes such as the interpolation of values falling between discrete image data points which represent an image.

In determining the values representing the reconstructed image data points ŝ(y) using equation (3), ŝ(0) is determined by summing each of the DCT coefficients S(v) times the cosine terms of the inverse basis function for y=0. For example, the value for ŝ(0.5) is determined as the summation of DCT coefficients S(v) times the cosine terms for y=0.5. This procedure, which indexes first on y then on v, is repeated for derivation of all desired reconstructed image data points ŝ(y) where $0 \leq y \leq (N-1)$.

As earlier noted, the above mathematics can be readily expanded to multiple dimensions as known by one of ordinary skill in the art. For instance, an image can be represented in the spatial domain in two-dimensional format as described in previously mentioned U.S. patent application Ser. No. 08/159,795, now abandoned where s(j,i) represents the image data points in the spatial domain, S(v,u) represents the corresponding DCT coefficients in the frequency domain, i represents the row number from 0 to (P-1), j represents the column number from 0 to (Q-1), P represents the total number of rows, and Q represents the total number of columns. The image data points s(j,i) may represent, but are not limited to, parameters such as brightness, luminance, color or hue.

Both equations (2) and (3) can alternatively be expressed in matrix notation. The matrix notation (without indices) for equation (2) is:

$$S = FB \times s \quad (4)$$

where S represents the matrix of DCT coefficients, s represents the matrix of image data points in the spatial domain, and FB represents the forward DCT basis matrix. Throughout this document, the operator "x" represents matrix multiplication. The matrix notation for equation (3) is:

$$\hat{s} = IB \times S \quad (5)$$

where ŝ represents the spatial matrix of reconstructed image data points, and IB represents the inverse DCT basis matrix for the desired output points (i.e. reconstructed image data points). Combining matrix equations (4) and (5) will reduce the number of arithmetic operations as opposed to performing the matrix algebra in two different steps as previously described. Combining matrix equations (4) and (5) yields:

$$\hat{s} = IB \times (FB \times s) = MB \times s \quad (6)$$

where MB is a combined DCT basis matrix derived from matrix multiplication of the inverse DCT basis matrix IB times the forward DCT basis matrix FB. The combined DCT basis matrix MB can be contemporaneously calculated while solving equation (6), or MB can be precalculated and stored in a look-up table.

2. Wiener Filtering

Figure 3A:
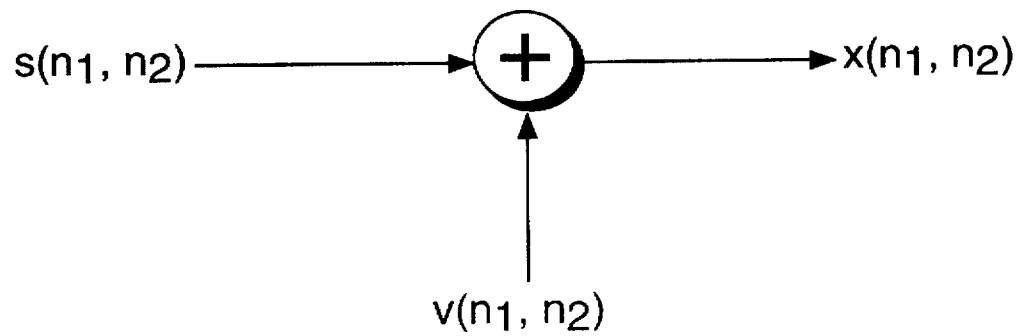
FIG. 3A is a schematic representation of an image subjected to additive noise.
Figure 3B:
FIG. 3B is a block diagram of a noisy image cleansed by a Wiener filter.

In the image noise removal literature, various image restoration methods have been described depending upon the type of degradation or noise and the way in which that degradation was modeled and estimated. The well known Wiener filter 300 (see FIG. 3B) was designed, according to the criterion of the lowest mean square error, as the single best filter for removing additive noise $v(n_1,n_2)$ from the noisy signal $x(n_1,n_2)$ to produce the restored signal $\hat{s}(n_1,n_2)$ which most closely represents the original image signal $s(n_1,n_2)$. The resulting optimum filter, labeled a non-causal Wiener filter, can be expressed as shown in equation (7), assuming that both the image signal $s(n_1,n_2)$ and the noise signal $v(n_1,n_2)$ are zero-mean, and the noise is uncorrelated, stationary and random.

$$H(\omega 1,\omega 2) = \frac{Ps(\omega 1,\omega 2)}{Ps(\omega 1,\omega 2) + Pv(\omega 1,\omega 2)} \qquad (7)$$

where $H(\omega_1,\omega_2)$ is the Fourier transform of the desired filter impulse response $h(n_1,n_2)$, and $P_s(\omega_1,\omega_2)$ and $P_v(\omega_1,\omega_2)$ are the power spectra of the image signal $s(n_1,n_2)$ and the noise signal $v(n_1,n_2)$, respectively.

One variation of the Wiener filter, known as the power spectrum filter, exhibits the following frequency response:

$$H(\omega 1,\omega 2) = \left( \frac{Ps(\omega 1,\omega 2)}{Ps(\omega 1,\omega 2) + Pv(\omega 1,\omega 2)} \right)^{1/2} \qquad (8)$$

Equation (8) is equal to the frequency response of the Wiener filter raised to the power ½. The frequency response of a generalized Wiener filter is represented as:

$$H(\omega 1,\omega 2) = \left( \frac{Ps(\omega 1,\omega 2)}{Ps(\omega 1,\omega 2) + \alpha Pv(\omega 1,\omega 2)} \right)^{\beta} \qquad (9)$$

where $\alpha$ and $\beta$ are variables which can be empirically determined for specific applications. Actually, the generalized Wiener filter of equation (9) encompasses both the Wiener filter of equation (7) (for $\alpha=1$ and $\beta=1$) and the power spectrum filter of equation (8) (for $\alpha=1$ and $\beta=½$).

In current practice, the use of a single restoration filter throughout the whole image is often undesirable since the characteristics of both the image and the noise can change considerably throughout different regions of the image. For example, the amount of noise in the system might be greater for dark regions than for bright regions, thus demanding a more adaptive noise removal scheme. Adaptive schemes can, of course, vary according to the frequency of adaptation and the local characteristics that are employed to control the amount of adaptation in the restoration algorithm.

3. Wiener Noise Modeling Hardware

Figure 2:
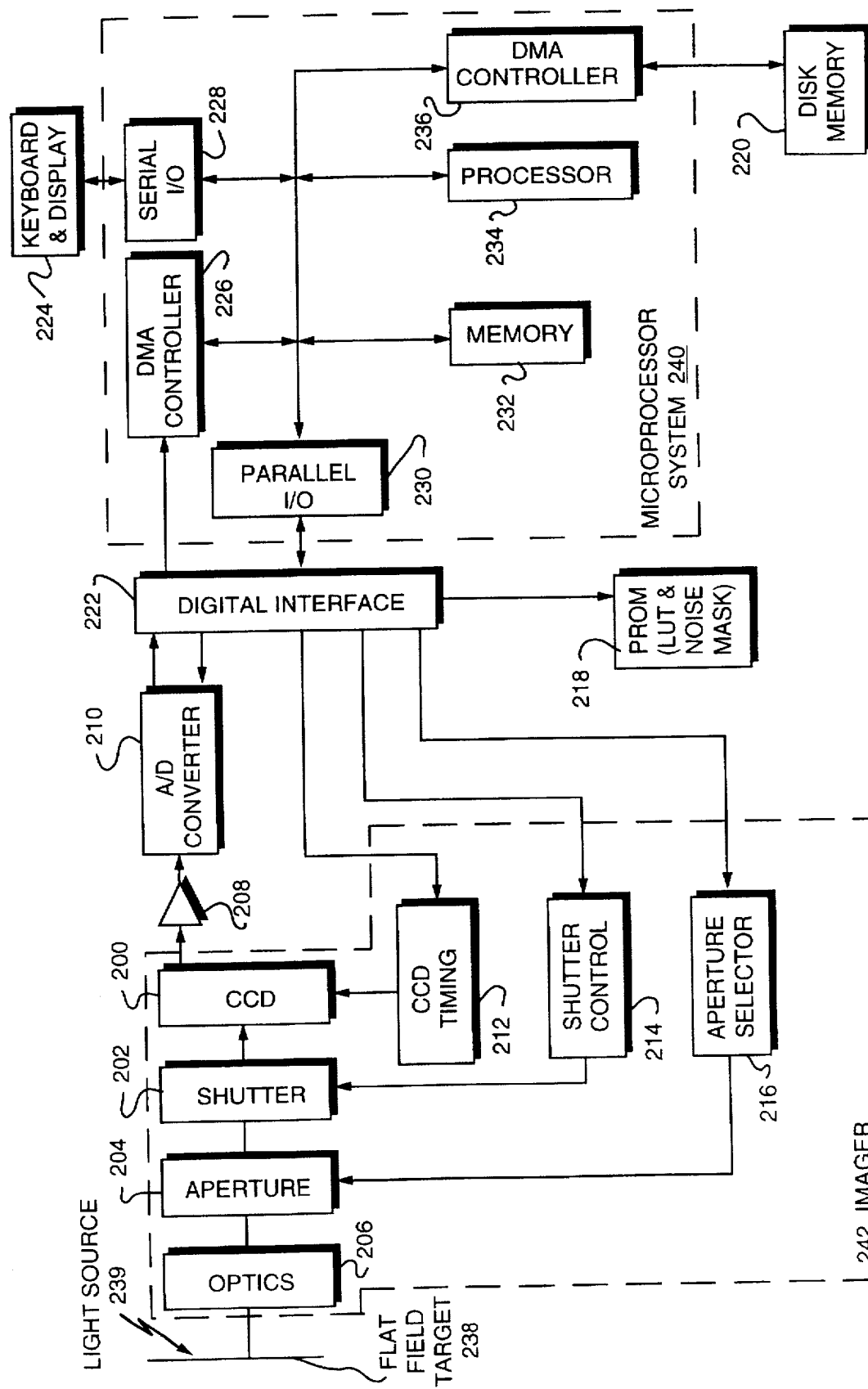
FIG. 2 is a detailed schematic block diagram of the system of FIG. 1 for noise modeling.

The Wiener noise modeling system of FIG. 2 depicts essential elements needed to characterize a Wiener noise mask for a CCD imager according to the invention. The system includes: a CCD imager (i.e. an image signal source) 242; a video preamplifier 208; a high speed analog to digital converter 210; a parallel digital interface 222; a programmable read only memory (PROM) 218; and a microprocessor 240. The system also includes a disk memory 220, a flat-field target 228 (i.e. a gray, colorless target of uniform illumination); and a keyboard and display 224. The CCD imager 242 consists of optics 206, aperture 204, aperture selector 216, shutter 202, shutter control 214, CCD 200 and CCD timing circuitry 212. The microprocessor 240 consists of two direct memory access (DMA) controllers 226 and 236, a parallel input/output port 230, a serial input/output port 228, a memory 232 and a processor 234. The optics 206 images the flat-field target 238 onto the active area of the CCD 200. The flat-field target 238 is illuminated by a light source 239 having a fixed and stable intensity with known spectral characteristics.

The brightness at the CCD 200 is adjustable via the aperture 204 to span the illuminance dynamic range of the imager 242. The shutter speed of the shutter 202 is controlled by shutter controller 214 to change the light exposure time for the CCD 200. The timing for the CCD phases is generated by an independent clock circuit (not shown) triggered from the digital interface. The analog output signal of the imager 242 is buffered, sampled and digitized by the video preamplifier 208. The samples are then sequentially transferred into the memory 232 of the microprocessor 240 through the digital interface 222 in concert with a first direct memory access (DMA) controller 226. The memory 232 is capable of storing an entire CCD frame as well as software for control, data acquisition, and signal processing. Data and software backup files are stored on the disk drive 220 which transfers data to main memory 232 by means of a second DMA controller 236. Operator commands, programs, and system status are available from the keyboard and display terminal 224.

The CCD 200 is characterized for various luminance levels for noise which is signal level dependent. Tests have shown that ten flat fields corresponding to ten brightness levels are adequate to completely describe the noise behavior of the CCD 200, although a variable number of flat fields could be used. A measurement cycle begins when the aperture selector 216 selects a predetermined aperture 204 and the shutter control 214 controls the shutter speed of the shutter for producing the lowest useable output level of the CCD 200. The CCD timing circuit 212 is enabled and the video from the preamp 208 is sampled and digitized in analog to digital converter 210. The output of the analog to digital converter 210 passes through the digital interface 222 to the direct memory access controller 226 to keep the transfer rate at a maximum. This reduces noise by minimizing the time period during which charge is able to build up in the charge wells of the CCD 200. At the conclusion of video frame acquisition the red, green and blue (RGB) pixel values, which have been stored in memory 232, are converted in the microprocessor 240 to luminance chrominance (YUV) space. The YUV components are processed separately as described in the following section entitled "Operation of the Noise Modeling System". At the end of each measurement cycle the processed noise mask and corresponding luminance level are stored to either disk 220 or PROM 218. The next cycle begins by selecting a new luminance level and repeating the above procedure. After measuring the noise of ten flat fields corresponding to ten luminance levels, the masks and luminance data are stored in the lookup tables (LUT) 714 and 732, respectively.

4. Operation of the Noise Modeling System of FIG. 2

Each type of image signal source exhibits specific noise characteristics or properties for each luminance and chrominance channel. In other words, noise modeling is a process of camera calibration whereby each luminance and chrominance channel should be separately modeled for noise removal. In attempting to remove the noise residing in an image, it is important to characterize the noise quantitatively so that the noise model can be used with conventional filtering devices such as a Wiener filter.

Assuming that the noise is stationary, the noise power spectrum, $P_v$, which is generally dependent upon the brightness of the scene, can be used to characterize the noise. In fact, the integral of the power spectrum represents the variance of the intensity of the image. Notably, different chromatic channels usually have different power spectra.

The steps involved in a preferred noise modeling method, applicable to the Wiener noise modeling system of FIG. 2, are shown in FIG. 2. In block 400, a plurality of flat-fields are selected at a first level to span the brightness range (typically 0 to 255) of the image signal source. A flat-field is defined as an image of a gray, colorless object of uniform brightness. As an example, one flat-field could have red, green and blue channels (RGB) with values of R=G=B=200 which corresponds to YUV luminance and chrominance channels having values of Y=200 and U=V=0. Another flat-field could have R=G=B=100, Y=100, and U=V=0. In either case, the object of the image ideally exhibits both a constant brightness, i.e. luminance value, and the absence of color. However, due to the introduction of noise which is inherent in any imaging device, a flat-field will not actually exhibit constant luminance and chrominance values. Rather, the Y luminance channel will consist of a constant luminance value plus noise and the U and V chrominance channels will consist of zero-mean random noise. In other words, the brightness of the luminance signal or the chrominance signal of a flat-field will fluctuate due to the noise component.

It has been empirically determined that ten flat-fields adequately sample the 0 to 255 brightness range of many image signal sources for noise modeling, although a different number of flat-fields can be selected for specific applications if desired. However, care should be taken to sample the complete brightness range of interest. In the current example, ten flat-fields are arbitrarily selected corresponding to brightness levels of 0, 25, 50, 81, 115, 144, 169, 195, 220 and 255.

In block 402, each flat-field is subdivided into 8×8 first segments and a forward DCT is performed on each first segment to yield 8×8 first level DCT arrays $S_1(v,u)$ of DCT coefficients which are useful in characterizing the noise in the flat-field. The 8×8 first segment size is selected for compatibility with standard image processing hardware, and the term "first segment" is used throughout this application to signify any first level segment. The first element $S(0,0)$ of each 8×8 array $S(v,u)$ of DCT coefficients is characterized as the DC coefficient, and the other elements of $S(v,u)$ are characterized as AC coefficients. First level modified DCT arrays $S_{mod1}(v,u)$ are generated by setting the DC coefficients in arrays $S_1(v,u)$ to zero. In block 404, a DCT noise power spectrum $P_v$ is generated for each first segment of each flat-field by squaring each of the 64 modified DCT coefficients $S_{mod1}(v,u)$ of each first segment. An average first segment power spectrum $P_v(ave1)$ is generated for each first level flat-field in block 406 by averaging corresponding elements of each first segment power spectrum in each first level flat-field. In other words, if a first level flat-field was partitioned into 256 first segments with each first segment being represented as an 8×8 array, then each array element at (0,1) would be summed and divided by 256 to determine the average array element at (0,1), each array element at (0,2) would be summed and divided by 256 to determine the average array element at (0,2), etc. In block 408, a first level noise mask is generated for each first level flat-field by taking the square root of each element of the average first segment power spectrum for each first level flat-field.

The first level noise masks, neglecting the DC elements, are similar in shape. Thus, each first level noise mask of a particular flat-field differs from that of another only by a first level scale factor or LUT value, which is generated in block 410 for each first level flat-field by squaring each element of each first level noise mask, summing the squared elements of each first level noise mask, dividing the sum by 64 to produce a quotient, then taking the square root of the quotient.

The first level LUT value is determined as a comparison of the mean luminance value of any individual flat-field to the mean luminance value of the average noise mask for that flat-field. The correlation between noise masks can be expressed as $$M_u = L(u)M \tag{10}$$

where:

$M^u$ represents the individual noise mask for the flat-field having a mean luminance value of u;

M represents a normalized noise mask; and

L(u) represents a LUT value dependent upon u.

In the current example, ten u values corresponding to the ten selected flat-fields are stored in a first level lookup table.

A typical image signal source is characterized by 256 different luminance levels and since only ten of the possible 256 luminance levels are empirically derived for the ten flat-fields selected, the other 246 luminance levels can be approximated by determining an interpolated scale factor between appropriate adjacent scale factors in the first level lookup table. Hence, a noise mask for any brightness level can be generated by multiplying either a stored or interpolated scale factor times the generic normalized noise mask. In this way, the generic normalized noise mask can be modeled to accurately gauge any brightness level for a given image signal source.

Prior to producing the first level genetic normalized noise mask, a normalized first level noise mask for each first level flat-field must be generated in block 412. Each element of each first level noise mask generated in block 408 is divided by the corresponding first level LUT value, that is, the scale factor generated for the respective first level flat-field. Then, in block 414, the generic normalized first level noise mask is generated by averaging corresponding elements of each of the normalized first level noise masks. In other words, the DC element is zero, the element at (0,1) is determined by adding each of the elements at (0,1) from the ten flat-fields then dividing by ten, the element at (0,2) is determined by adding each of the elements at (0,2) from the ten flat-fields then dividing by ten, etc.

Figure 5A:
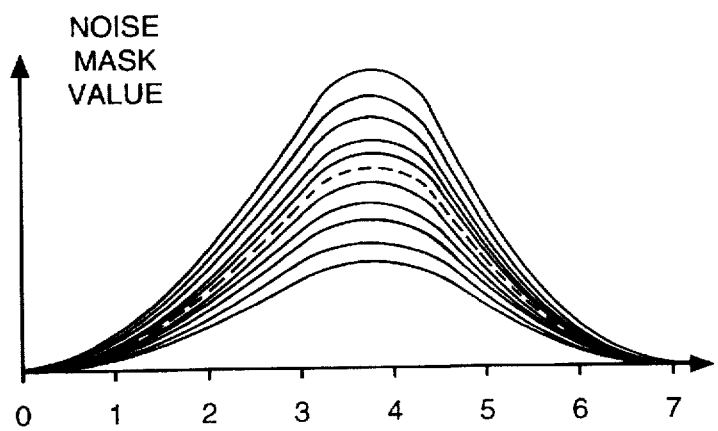
FIG. 5A is a one-dimensional graphical representation of eight bit noise masks for ten flat-fields used for noise modeling in the system of FIG. 2 according to the method of FIG. 3.
Figure 5B:
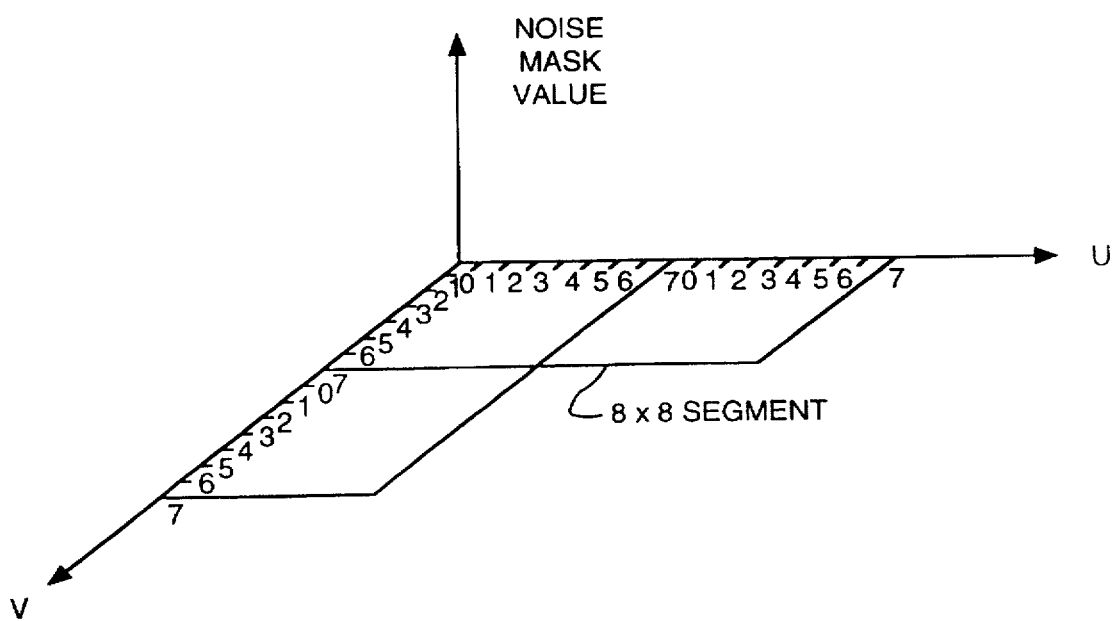
FIG. 5B is a two-dimensional representation of a graph for plotting 8×8 bit noise masks according to the noise modeling method of FIG. 4.

As indicated earlier, the noise content in each flat-field imaged by the image signal source is dependent upon the brightness level of the object, i.e. the brightness level is defined by the mean luminance value of the flat-field which is stored as the DC component of each individual noise mask. As a result the noise in each flat-field varies, so that each flat-field includes a distinct noise signal component to be removed by the individual first level noise mask having a distinct mean luminance value. As earlier stated, the first level noise masks, neglecting the DC components, are similar in shape. For example, the graph of FIG. 5A plots first level normalized noise masks derived from ten flat-fields plus a generic normalized noise mask (indicated by the dotted line) as a function of the noise mask value versus the index v for each element of an eight point first segment represented as an 8×1 matrix. More realistically, a first level normalized noise mask would be modeled in two dimensions on a graph similar to the one illustrated by FIG. 5B, although the noise modeling techniques described herein could readily be expanded to any number of dimensions as understood by those of ordinary skill in the art. FIG. 5B shows three perpendicular axes for plotting a two dimensional first level normalized noise mask as the noise mask value versus DCT indices u and v which, in turn, extend to the limits of P and Q, respectively, in defining the predetermined size of the image. Each of the above parameters used in this discussion has been previously defined and described in conjunction with the DCT mathematics used to facilitate the inventive methods. FIG. 5B demonstrates the partitioning of a flat-field into 8×8 first segments. If the graph of FIG. 5A was expanded and mapped to FIG. 5B in two dimensions, the result would be ten two-dimensional curved surfaces, plus an average curved surface corresponding to the dotted line of FIG. 5A. Each element of each 8×8 first segment in FIG. 3B would map onto ten distinct first level normalized noise masks, plus the generic normalized noise mask of the average curved surface.

One problem with the above noise modeling scheme comes from the segmentation of the image. Clearly as described above, the first level normalized noise mask and LUT values are useful to characterize the intra-segment noise. However, the low frequency noise, with a wavelength which is long with respect to the segment size, cannot be modeled. To solve this problem, a hierarchical approach is employed in a pyramid noise reduction scheme. The noise is modeled at multiple levels, whereby each level represents a scaled version of the DCT coefficients of the flat-fields. In other words, a pyramid representation of the flat-fields is constructed, then a lookup table and a normalized noise mask are generated for each level of the pyramid.

Figure 4:
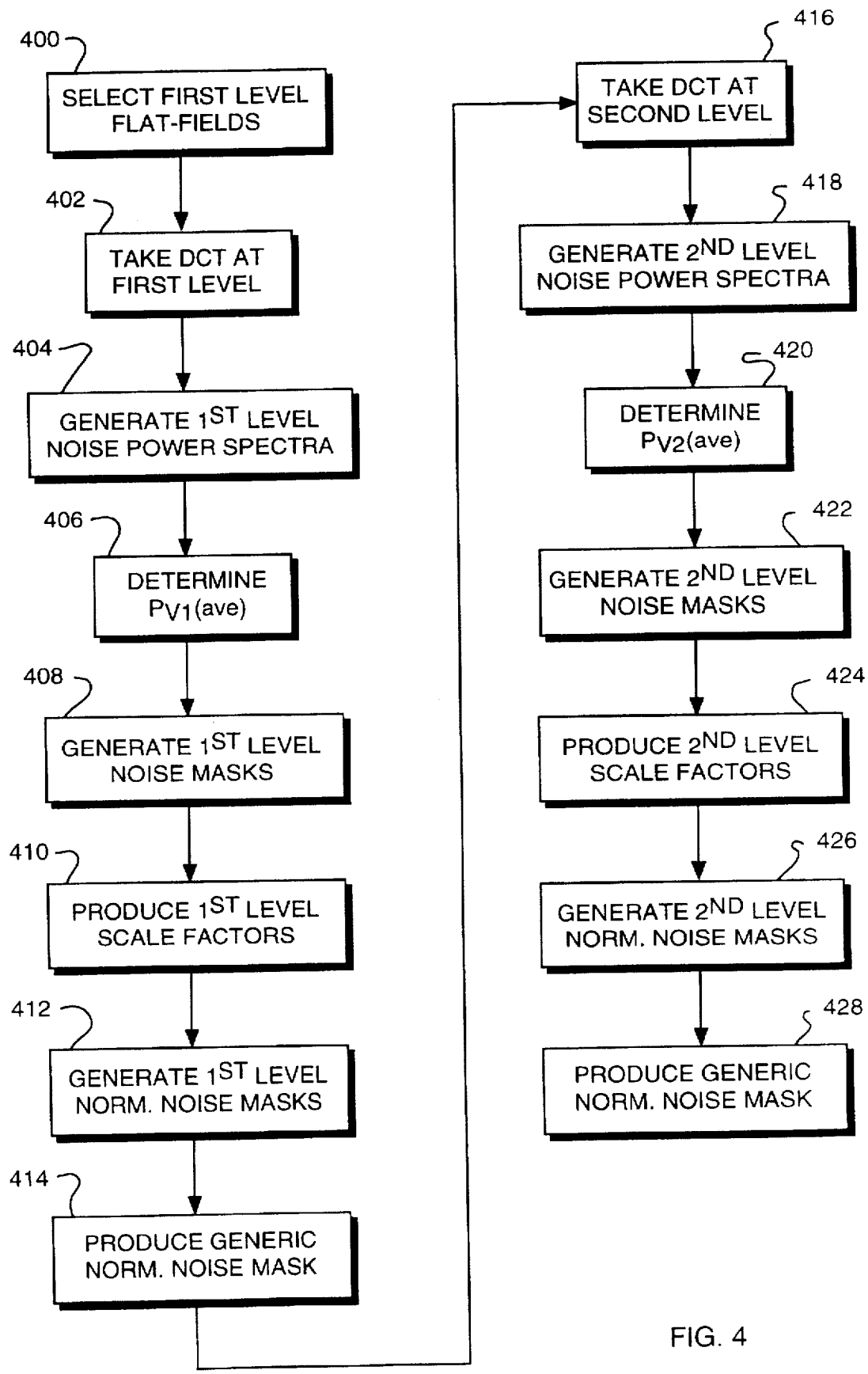
FIG. 4 is a block diagram of a noise modeling method applicable to the noise modeling system of FIG. 1.

The procedure for building a pyramid for multi-level noise modeling is described for two levels in FIG. 4. This procedure could easily be expanded to any number of levels by duplicating the sequence of steps used to build the second level. The first level processing to generate first level scale factors and a first level generic normalized noise mask was previously described for blocks 200–214.

Figure 6A:
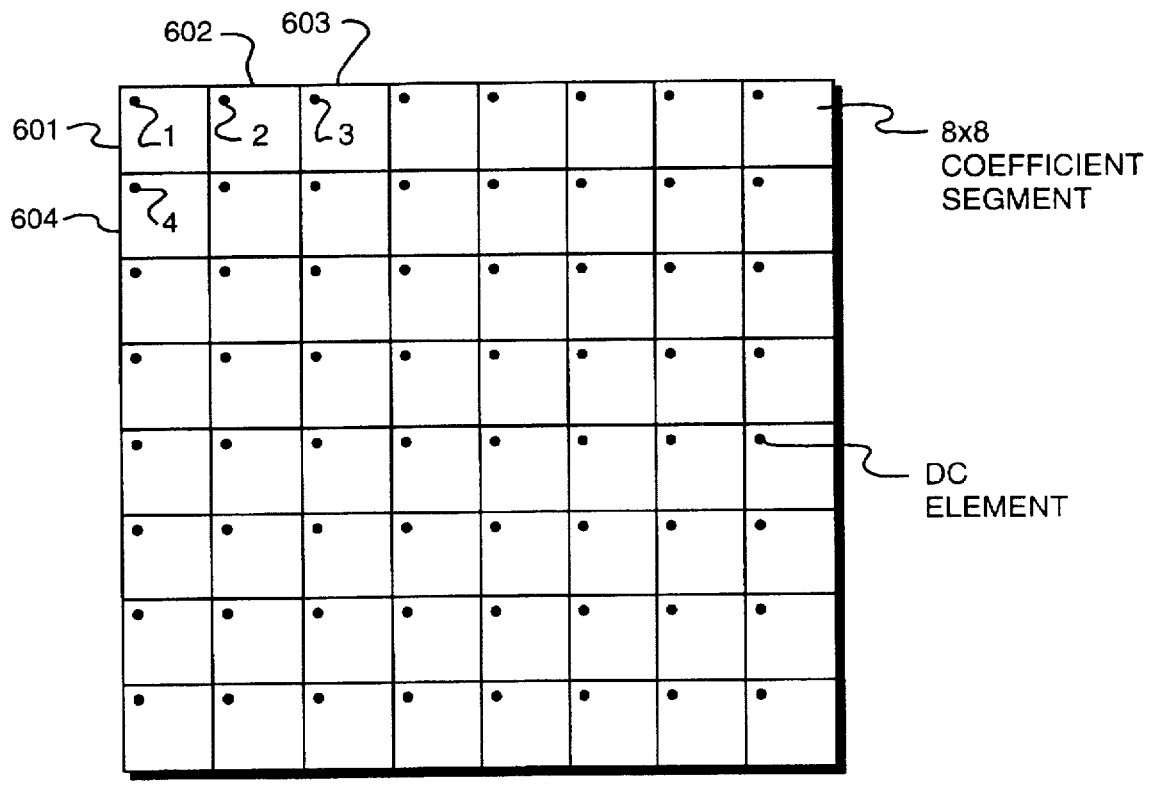
FIG. 6A is a representation of a 64×64 pixel image subdivided into 8×8 block segments with the upper left hand pixel of each segment depicted as a solid dot.
Figure 6B:
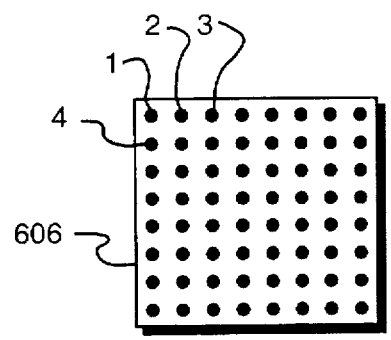
FIG. 6B is a down sampled version of FIG. 5A made up of the upper left hand pixels of each segment of FIG. 5A.

Continuing the previous example which used ten preselected flat-fields, the second level processing begins in block 414 where, for each flat-field, the first level DCT coefficients $S_1(v,u)$ are downsampled by taking the first element $S_1(0,0)$, i.e. the DC element, of each first segment and forming second level flat-fields which include only the DC elements from the first level DCT coefficients. The spatial ordering of the downsampled elements remains undisturbed. This downsampling scheme is illustrated in FIGS. 6A and 6B. FIG. 6A represents a first level 64×64 pixel flat-field which has been partitioned into 8×8 first segments and subjected to DCT transformation. FIG. 6B represents only the DC elements of FIG. 6A, i.e. the second level flat-field of downsampled DCT coefficients which forms one 8×8 second segment in this illustration. The term "second segment" is used throughout this application to identify any 8×8 second level segment. The DC coefficient 1 of 8×8 first segment 601 in FIG. 6A becomes the element 1 of 8×8 second segment 606 in FIG. 6B; the DC coefficient 2 of first segment 402 becomes element 2 of second segment 606; the DC coefficient 3 of first segment 603 becomes element 3 of second segment 606; etc. The remainder of the first segments are downsampled in the same manner.

In block 416 second level DCT arrays $S_2(v,u)$ of DCT coefficients are generated by first partitioning the second level flat-field of FIG. 6B into 8×8 second segments, then taking the DCT of each second segment. Second level modified DCT arrays $S_{mod2}(v,u)$ are generated by setting the DC coefficients in $S_2(v,u)$ to zero. Second level noise power spectra are generated for the second segments by squaring the second level modified DCT coefficients in block 418. An average second segment power spectrum $P_{v2}(ave)$ is generated for each second level flat-field in block 420 by averaging corresponding elements of each first segment power spectrum in each second level flat-field. In block 422, a second level noise mask is generated for each second level flat-field by taking the square root of each element of the average second segment power spectrum for each flat-field. Each second level noise mask of a particular flat-field differs from that of another only by a second level LUT value, which is generated in block 424 for each second level flat-field by squaring each element of each second level noise mask, summing the squared elements of each second level noise mask, dividing the sum by 64 to produce a quotient, then taking the square root of the quotient. To generate a normalized second level noise mask in block 426 for each second level flat-field, each element of each second level noise mask generated in block 422 is divided by the corresponding second level LUT value, that is, the scale factor generated for the respective second level flat-field. Finally in block 428, a generic normalized second level noise mask is generated by averaging corresponding elements of each of the normalized second level noise masks. The above procedure could, of course, be repeated for additional pyramid levels if necessary. In general, it has been determined that three levels provide adequate noise removal results.

The above noise modeling procedure should most advantageously be applied to each luminance and chrominance channel. For a typical image signal source having one luminance and two chrominance channels, this amounts to the requirement of generating 9 lookup tables and 9 noise masks for a three level pyramid structure. Note that the lookup tables for both the luminance and the chrominance channels are indexed by the mean value of the luminance component since the mean of a chrominance component of any flat-field is expected to be zero, and the noise level in the chrominance components depends upon the overall intensity of the flat-field, i.e. the brightness of the object.

5. The Wiener Noise Filtering System of FIG. 7

Figure 7:
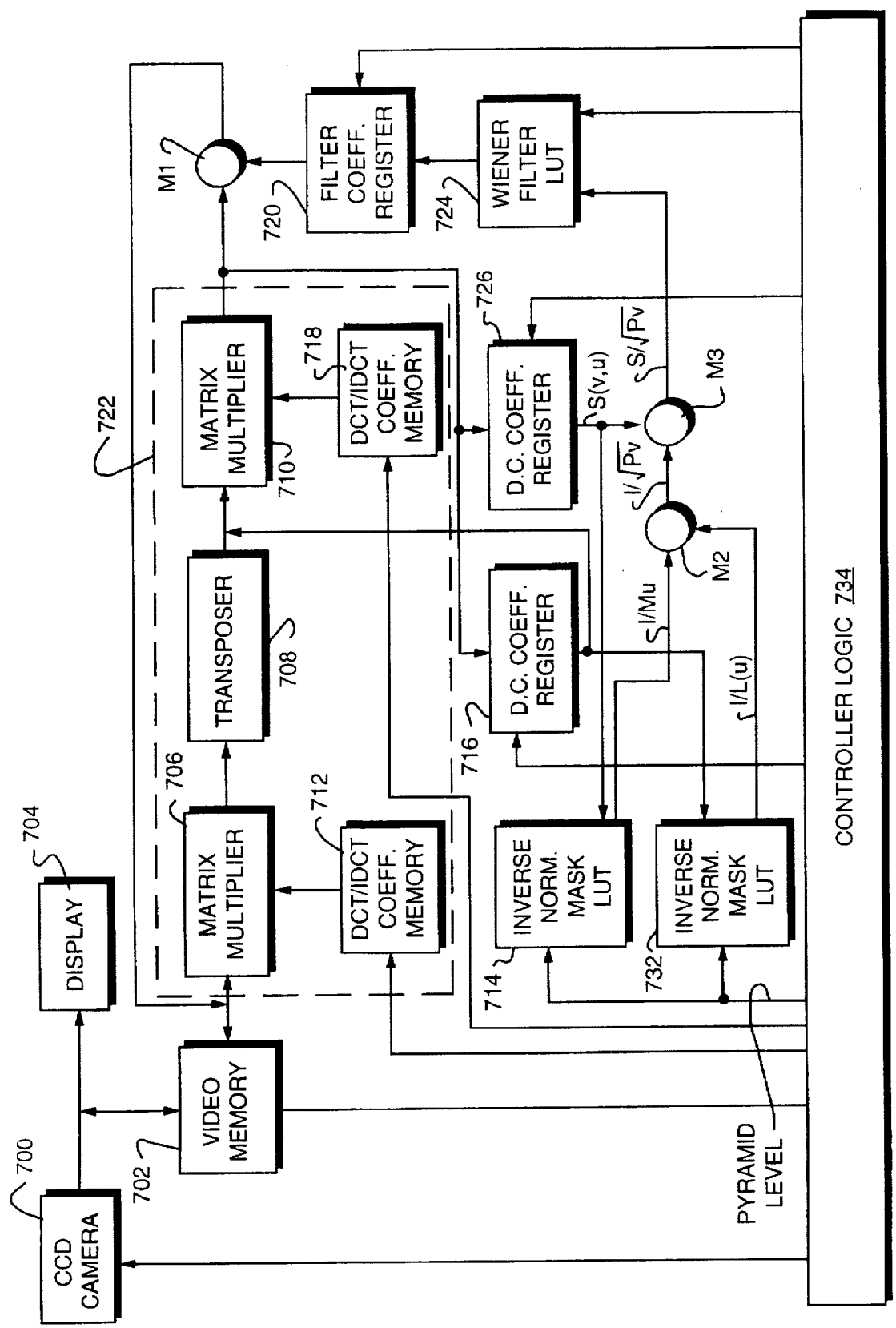
FIG. 7 is a detailed block diagram of the system of FIG. 1 for adaptive Wiener noise filtering.

The essential elements of an adaptive Wiener noise filter using a CCD digital still camera as an image signal source are depicted in FIG. 7. The filter system consists of a CCD camera 700, a video memory 702, an 8×8 block DCT processor 722, a DC coefficient register 716, an AC coefficient register 726, a filter coefficient register 720, an inverse normalized mask lookup table 714, an inverse luminance level lookup table 732, multipliers M1, M2, M3, Wiener filter lookup table 724, display 704 and controller logic 734. The DCT processor 722 includes two matrix multipliers 706, 710, two DCT/IDCT coefficient memories 712, 718 and a transpose memory 708. The input to the video memory 702 is the CCD camera 700 with associated lenses, shutter control, analog to digital converter, RGB to YUV converter, and timing circuits (not shown). The previously measured noise characteristics of the CCD 700 are stored in the inverse normalized mask LUT 714 and the inverse luminance level LUT 732. Both filtered and unfiltered images can be displayed on the digital monitor 704 which is connected to a serial port of the video memory 702.

Each YUV component is processed into three levels in DCT space as described in the following section entitled "Pyramid Image Representation". The image signal from the camera 700 is stored in the video memory 702 in raster scan format, so as to be compatible with the display 704. The format of the image signal is converted to 8×8 blocks by the controller 734 generating the appropriate addresses in the video memory 702. The DCT processor 722 converts the 8×8 blocks into frequency space. The DC coefficient of a block is taken as its average luminance value and is stored in the DC coefficient register 716. It remains in the register 716 for the duration of the filtering operation of the remaining 63 AC coefficients of the block. Prior to filtering, each AC coefficient is stored temporarily in the AC coefficient register 726. The AC coefficient is held in the register 726 until it has been weighted by the filter value at which point it is written back into the video memory 702.

The output from the DC coefficient register 716, and the pyramid level serve as addresses to access the inverse luminance level LUT 732. The output from the AC coefficient register 726, and the pyramid level serve as addresses to access the inverse normalized mask LUT. The multiplier M2 forms the product of the retrieved inverse luminance value 1/L(u) and the retrieved inverse normalized noise mask value 1/Mu. This product equals the inverse square root of the noise power $1/P_v^{1/2}$. The multiplier M3 forms the product of $1/P_v^{1/2}$ and the associated AC coefficient S. The ratio $S/P_v^{1/2}$ serves as the address to the Wiener filter LUT 724 which contains the precalculated filter function for the appropriate choices of predetermined tuning values α and β. The retrieved filter coefficient from the LUT 724 is stored temporarily in the filter coefficient register 720 where it can be retrieved and multiplied times the AC coefficient in multiplier M1 to form a weighted AC coefficient. The weighted AC coefficient is stored back into the video memory 702 and a new AC coefficient from the DCT processor 722 is passed to the AC coefficient register 726. When all 63 AC coefficients have been processed as described above, the original DC coefficient for the block is returned unmodified to the video memory 702. After all the blocks have been filtered, the DC coefficients stored in memory 702 represent a subsampled image for the second level of the pyramid. The second level is filtered in the same manner as the first level, and the DC coefficients of all of the 8×8 blocks of the second level together form the third level of the pyramid. Additional levels could be constructed if desired, although this preferred embodiment is limited to three pyramid levels.

The image is reconstructed in the manner outlined in the following section entitled "Image Restoration". The process begins by performing an IDCT on the filtered 8×8 blocks of the third level. This is accomplished by changing the predetermined matrices of the DCT/IDCT coefficient memories and passing each third level block through the DCT processor 722. The IDCT coefficients pass through the multiplier M1 modified and replace the DC coefficients of the second level blocks. When all the second level DC values have been restored, processing continues for reconstruction of the first level blocks. The IDCT is performed on the second level blocks to produce the first level blocks of IDCT coefficients, which in turn represent the reconstructed image.

6. Operation Of The Noise Filtering System

An image can be represented at different frequency levels using a pyramid image representation whereby the frequencies of the electronic waveforms representing the image are subdivided into a different frequency band at each pyramid level. For instance, an image signal can be divided into three levels, i.e. a first level representing a high frequency component of the electronic waveform, a second level representing a mid-frequency component of the electronic waveform, and a third level representing a low frequency component of the electronic waveform. Noise modeling and subsequent noise reduction can then be performed at each level to ensure adequate filtering at all frequencies of interest.

One example of the use of a pyramid image representation for image processing was introduced by Burr and Adelson, "The Laplacian Pyramid as a Compact Image Code", IEEE Trans. on COM, Vol. COM-31, No. 4, April 1983, as the Laplacian pyramid based on Laplacian transforms. The Laplacian pyramid includes filtering and downsampling of an image from one level to another by application of a Laplacian filtering function. The result is a compact image representation which is useful for image coding. For the current inventive system and method, a pyramid image structure is subjected to a variant of Wiener filtering followed by image restoration. These steps are described, for the preferred embodiment, in the following sections (i), (ii) and (iii).

(i) Pyramid Image Representation

Figure 8A:
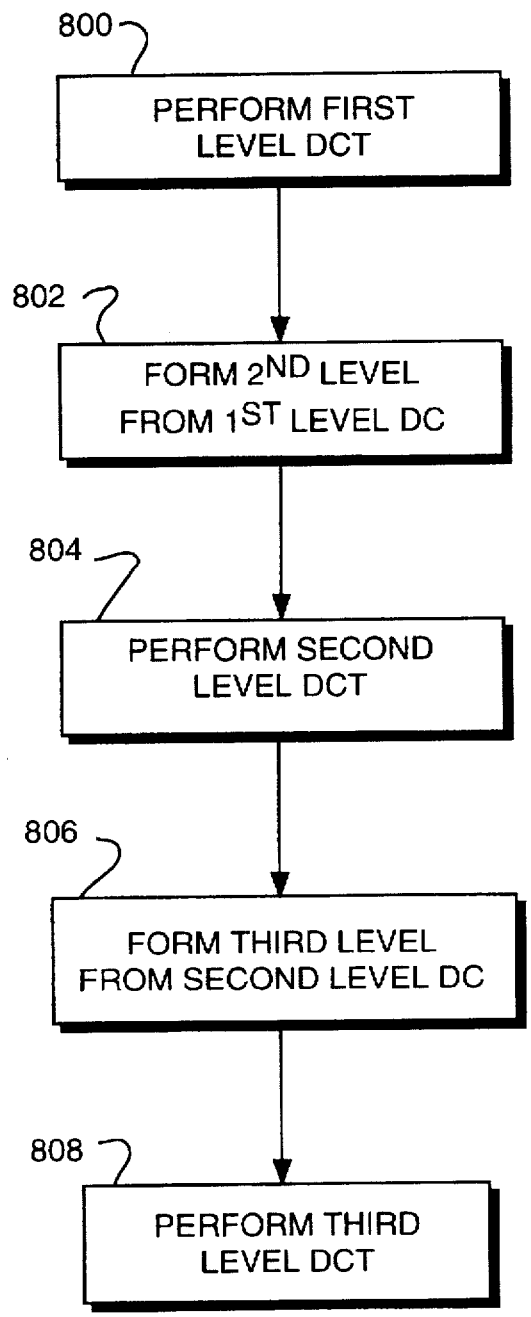
FIG. 8A is a block diagram of a three level pyramid image representation method applicable to the noise filtering system of FIG. 7.

When constructing the pyramid image representation as detailed by the steps of FIG. 8A, the image signal resident in the spatial domain is segmented at the first level in block 800 into 8×8 first level segments. Other segment sizes are also possible, but the preferred embodiment is compatible with JPEG compression standards using 8×8 segment sizes and conventional hardware. A DCT is then performed on each first level segment to generate first level DCT coefficients which are stored in memory for each first level segment. In block 802, average first level DC (direct current) values at the (0,0) position of each first level segment are determined, ordered (as previously described in conjunction with FIGS. 6A and 6B) to provide a second level representation of the image signal, and then stored in memory. Each average first level DC value represents an average value of the 64 pixels of the corresponding first level segment. The second level representation of the image signal is then segmented in block 804 into 8×8 second level segments. A DCT is then performed on each second level segment to generate second level DCT coefficients which are stored in memory for each second level segment. In block 806, average second level DC values for each second level segment are determined, ordered (as previously described in conjunction with FIGS. 6A and 6B) to provide a third level representation of the image signal, and then stored in memory. A DCT is then performed on each third level segment in block 808 to generate third level DCT coefficients which are stored in memory for each third level segment.

The above described procedure results in a DCT pyramid image representation having three levels. Each level consists of a plurality of DCT coefficients which can be partitioned into 8×8 segments. Each segment at each level includes both a singular DC value which represents an average DCT coefficient value for that segment, plus 63 AC (alternating current) coefficient values. Each level of DCT coefficients represents a different frequency band of the image signal. Note that here "frequency" means "DCT frequency". The first level DCT coefficients represent high frequency components, the second level DCT coefficients represent mid-frequency components, and the third level DCT coefficients represent low frequency components. Thus, unwanted noise can be minimized or removed from a noisy signal by filtering the frequency components of each level at high, mid and low frequencies.

(ii) Wiener Variant Filtering

Figure 8B:
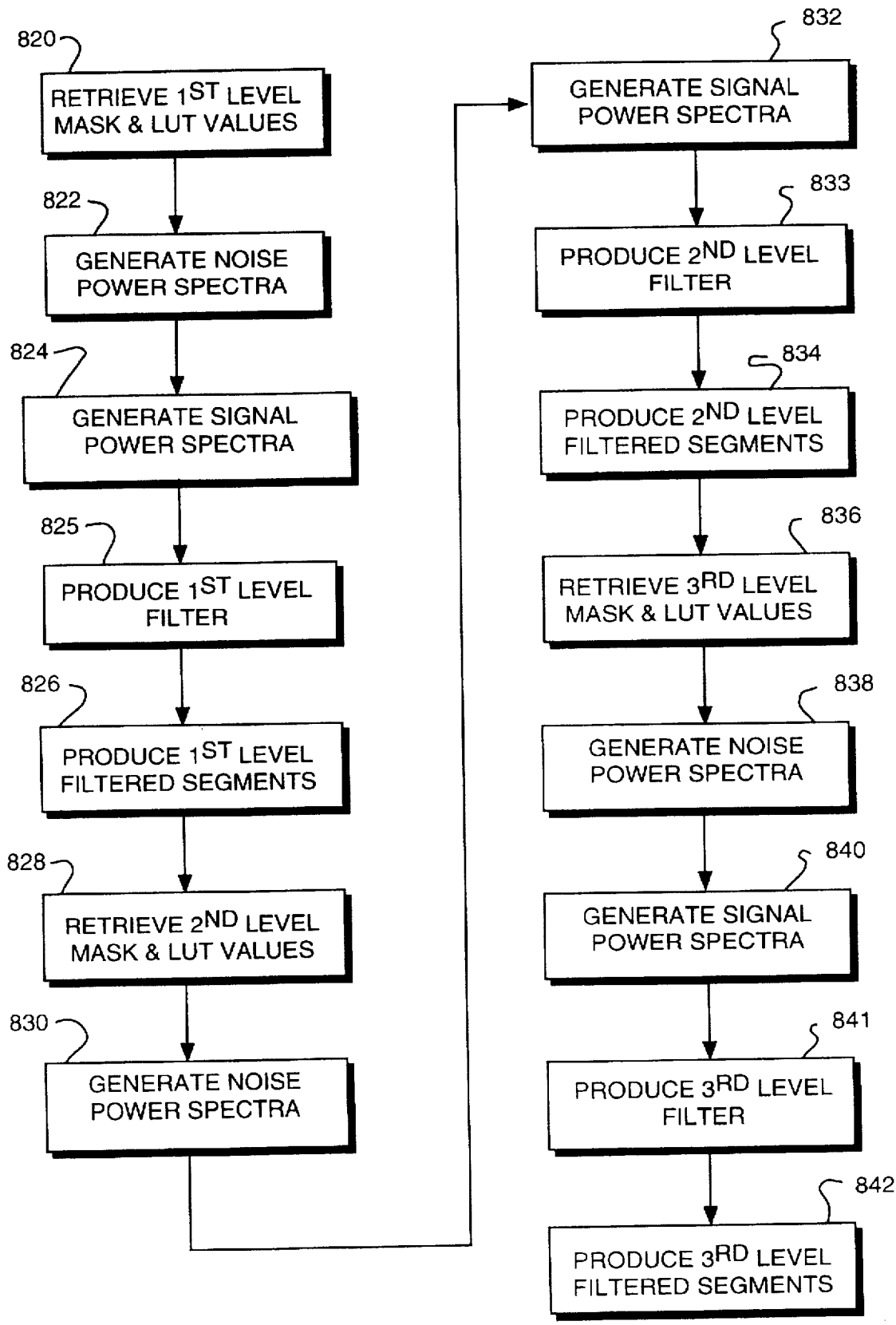
FIG. 8B is a block diagram of a Wiener variant filtering method applicable to the noise filtering system of FIG. 7.

Wiener filters are functions of Fourier transforms as previously discussed. However, a variant of the generalized Wiener filter of equation (9) is implemented in the current invention by replacing Fourier transforms with DCT transforms. In this way, DCT hardware can be utilized in a filtering device. The complete riteting method is described in detail according to the steps of FIG. 8B.

For our example, an image signal source has been subjected to noise modeling as previously discussed so that each of the three levels of the pyramid image representation has been provided with a predetermined genetic normalized noise mask and a series of predetermined luminance dependent LUT values stored in memory. In block 820 a predetermined generic normalized first level noise mask and predetermined first level LUT values are retrieved from memory. The first level LUT values are multiplied times the genetic normalized first level noise mask in block 822 to produce a first level noise mask. Thereafter the values of the first level noise mask are squared to produce the power spectrum $P_v(\omega 1, \omega 2)$ for each first level 8×8 segment. Then in block 824, a first level signal power spectrum $P_s(\omega 1, \omega 2)$ for each first level segment is generated by squaring the first level DCT coefficients of each first level segment. The riter for the first level segments is generated in block 825 in accordance with the DCT Wiener variant filter (see equation (9) by first multiplying a predetermined value (α times the first level noise power spectrum $P_x(\omega 1,\omega)$ to obtain a first filter product, $P_y(\omega 1, \omega 2)$, then adding the first filter product and the first level signal power spectrum $P_s(\omega 1,\omega 2)$ to obtain a first sum, $P_s(\omega 1, \omega 2)+\alpha P_y(\omega 1,\omega 2)$, then dividing the first sum into the first level signal power spectrum to provide a first quotient, and finally producing the first level filtered segment by raising the first quotient to the power of a predetermined value β. The first level filtered segments are generated in block 826 by element-by-element (mask) multiplication of the filter $H(\omega 1,\omega 2)$ times each segment.

The above procedure is repeated for the second level in blocks 828 through 834 and for the third level in blocks 836 through 842.

(iii) Image Restoration

Figure 8C:
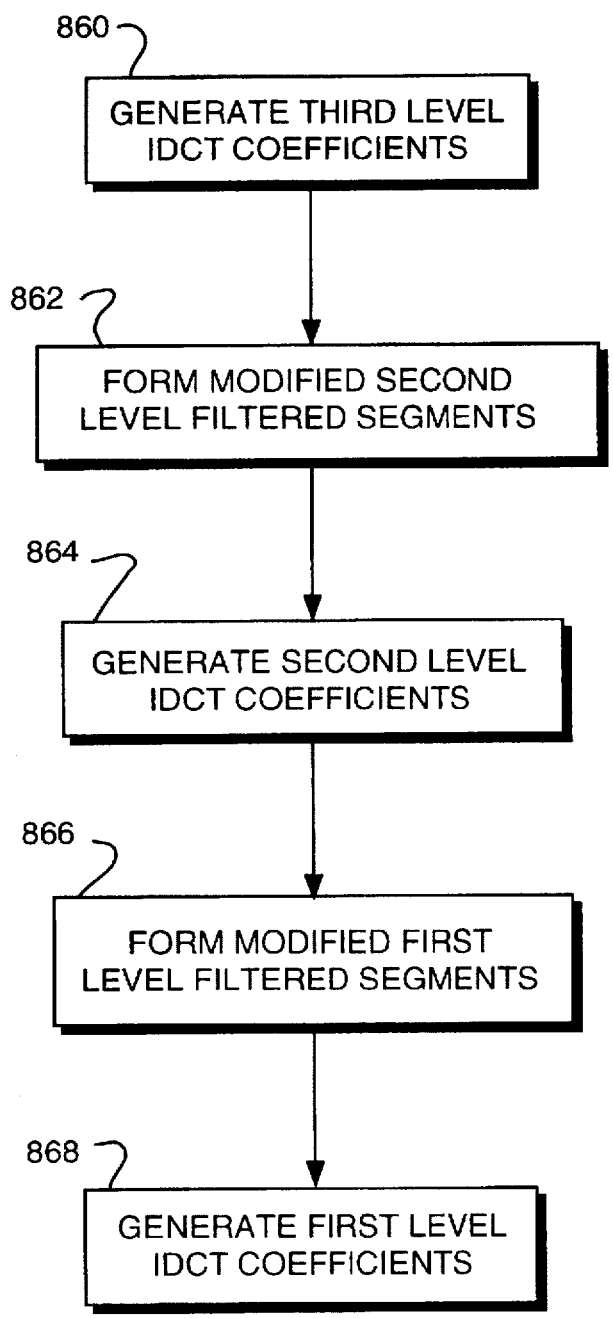
FIG. 8C is a block diagram of an image restoration method applicable to the noise filtering system of FIG. 7.

Once the DCT coefficient at each level of the pyramid image representation are filtered with a Wiener variant filter as described above, the filtered image is ready to be restored according to the steps shown in the block diagram of FIG. 8C. In block 860, third level IDCT coefficients are generated by performing an IDCT on each third level 8×8 segment. Modified second level 8×8 filtered segments are generated in block 662 by retrieving the second level filtered segments from memory and replacing the second level DC values with corresponding third level IDCT coefficients. In block 864, second level IDCT coefficients are generated in 8×8 segments by performing an IDCT on each modified second level filtered segment. Modified first level 8×8 filtered segments are generated in block 866 by retrieving first level filtered segments from memory then replacing the first level DC values with corresponding second level IDCT coefficients. In block 868, first level IDCT coefficients are generated by performing an IDCT on each modified first level 8×8 filtered segment. The first level IDCT coefficients represent the restored image, i.e. the noise reduced image, for the processed luminance or chrominance channel. The above procedure is repeated until noise reduction has been effectuated for each channel of the image signal source.

Although the above preferred embodiment does not use overlapping of adjacent 8×8 segments, overlapping of any number of pixels in each dimension could be done at each pyramid level. Accordingly in the image restoration stage, unoverlapping must occur at each level. Overlapping is well known by those of ordinary skill in the art, and the details of an overlapping scheme appropriate for the current invention are described in the parent application.

The above described embodiments of the present invention are merely illustrative of the many possible specific embodiments and variations of the invention as claimed. Numerous equivalents of the claimed devices and methods are within the purview of the claims as understood by those of ordinary skill in the art in keeping with the spirit and scope of the invention as claimed.

What is claimed is:

1. A system for modeling noise of an image signal source, said system comprising:

a gray target of uniform illuminance defined as a flat-field;

said image signal source for capturing an image signal representing an image of said flat-field;

a preamplifier for amplifying said captured image signal;

an analog-to-digital converter for digitally formatting said amplified image signal;

a digital interface for interfacing said digital image signal with a microprocessor;

said microprocessor for processing said digital image signal using discrete cosine transforms to produce a noise mask and values for a lookup table; and memory for storing said noise mask and said lookup table values, wherein said microprocessor processes said digital image signal by selecting a plurality of flat-fields at a first level, each said first level flat-field having a different luminance level, partitioning each said first level flat-field into a plurality of first segments, each said first segment having a predetermined number of elements, performing a forward discrete even cosine transformation (DCT) on each said first segment to yield first level DCT coefficients characterizing first level noise in each said first segment, setting to zero a first element, defined as a DC element, of said first level DCT coefficients for each said first segment, generating a first segment power spectrum for each said first segment of each said first level flat-field by squaring said first level DCT coefficients from step (9d), generating an average first segment power spectrum of each said first level flat-field by averaging corresponding elements of said first segment power spectra within each said first level flat-field, generating a first level noise mask for each said first level flat-field by taking the square root of each element of said average first segment power spectrum for each said flat-field, generating a first level scale factor for each said first level flat-field by squaring each element of each said first level noise mask, summing the squared elements of each said first level noise mask, dividing the sum by said predetermined number to produce a quotient, then taking the square root of the quotient, wherein said values of said lookup table comprise said first level scale factors, generating a normalized first level noise mask for each said first level flat-field by dividing each element of said first level noise masks by said corresponding first level scale factor, and generating a generic normalized first level noise mask by averaging corresponding elements of said normalized first level noise masks.

2. The system of claim 1, further comprising an operator interface for communicating with said microprocessor.

3. The system of claim 1, wherein further processing in said microprocessor comprises:

(10a) downsampling by taking said DC elements from (9d) to generate a plurality of second level flat-fields;

(10b) partitioning each said second level flat-field into a plurality of second segments, each said second segment having said predetermined number of elements;

(10c) performing a DCT on each said second segment to yield second level DCT coefficients characterizing second level noise in each said second segment;

(10d) setting to zero a first element, defined as a DC element, of said second level DCT coefficients for each said second segment;

(10e) generating a second segment power spectrum for each said second segment of each said second level flat-field by squaring said second level DCT coefficients from (10d);

(10f) generating an average second segment power spectrum of each said second level flat-field by averaging corresponding elements of said second segment power spectra within each said second level flat-field;

(10g) generating a second level noise mask for each said second level flat-field by taking the square root of each element of said average second segment power spectrum;

(10h) generating a second level scale factor for each said second level flat-field by squaring each element of each said second level noise mask, summing the squared elements of each said second level noise mask, dividing the sum by said predetermined number, and taking the square root of the quotient, wherein said values of said lookup table comprise said second level scale factors;

(10i) generating a normalized second level noise mask for each said second level flat-field by dividing each element of said second level noise masks by said corresponding second level scale factor; and (10j) generating a generic normalized second level noise mask by averaging corresponding elements of said normalized second level noise masks.

4. A system for filtering noise from an image of a scene, said system comprising:

an image signal source for capturing an image signal representing said image;

a memory for storing said image signal received from said image signal source in raster format;

an inverse normalized mask lookup table (LUT) for storing predetermined noise masks;

an inverse luminance level LUT for storing predetermined luminance LUT values corresponding to predetermined luminance levels;

a controller for converting said image signal of said memory into block format, and for generating control signals for said system;

a discrete cosine transform processor for processing and convening said block formatted image signal into frequency space;

a direct current (DC) coefficient register for storing DC coefficients representing luminance averages of said blocks;

an alternating current (AC) coefficient register for storing AC coefficients of said blocks;

a first multiplier for generating a first product by multiplying one of said predetermined luminance LUT values times one of said predetermined noise masks;

a second multiplier for generating a second product by multiplying said first product times an associated AC coefficient from said AC coefficient register;

a Wiener filter LUT for providing a predetermined falter coefficient in response to both the second product and a control signal from said controller;

a filter coefficient register for temporarily storing said predetermined filter coefficient; and a third multiplier for generating a third product by multiplying said predetermined filter coefficient times said associated AC coefficient, said third product being a weighted AC coefficient to be stored in said video memory.

5. A method of generating a noise mask for one of a luminance and a chrominance channel of an image signal source, said method comprising the steps of:

(12a) defining a flat-field as an image of an object of uniform luminance being a gray target of uniform brightness;

(12b) selecting a plurality of first level flat-fields with said image signal source, each said first level flat-field having a different luminance level;

(12c) partitioning each said first level flat-field into a plurality of first segments, each said first segment having a predetermined number of elements;

(12d) performing a forward discrete even cosine transformation (DCT) on each said first segment to yield first level DCT coefficients characterizing first level noise in each said first segment;

(12e) setting to zero a first element, defined as a DC element, of said first level DCT coefficients for each said first segment;

(12f) generating a first segment power spectrum for each said first segment of each said first level flat-field by squaring said first level DCT coefficients from step (12e);

(12g) generating an average first segment power spectrum of each said first level flat-field by averaging corresponding elements of said first segment power spectra within each said first level flat-field;

(12h) generating a first level noise mask for each said first level flat-field by taking the square root of each element of said average first segment power spectrum for each said flat-field;

(12i) generating a first level scale factor for each said first level flat-field by squaring each element of each said first level noise mask, summing the squared elements of each said first level noise mask, dividing the sum by said predetermined number to produce a quotient, then taking the square root of the quotient;

(12j) generating a normalized first level noise mask for each said first level flat-field by dividing each element of said first level noise masks by said corresponding first level scale factor; and (12k) generating a generic normalized first level noise mask by averaging corresponding elements of said normalized first level noise masks.

6. The method of claim 5, further comprising the steps of:

(13a) downsampling by taking said DC elements from step (12e) to generate a plurality of second level flat-fields;

(13b) partitioning each said second level flat-field into a plurality of second segments, each said second segment having said predetermined number of elements;

(13c) performing a DCT on each said second segment to yield second level DCT coefficients characterizing second level noise in each said second segment;

(13d) setting to zero a first element, defined as a DC element, of said second level DCT coefficients for each said second segment;

(13e) generating a second segment power spectrum for each said second segment of each said second level flat-field by squaring said second level DCT coefficients from step (13d);

(13f) generating an average second segment power spectrum of each said second level flat-field by averaging corresponding elements of said second segment power spectra within each said second level flat-field;

(13g) generating a second level noise mask for each said second level flat-field by taking the square root of each element of said average second segment power spectrum;

(13h) generating a second level scale factor for each said second level flat-field by squaring each element of each said second level noise mask, summing the squared elements of each said second level noise mask, dividing the sum by said predetermined number, and taking the square root of the quotient;

(13i) generating a normalized second level noise mask for each said second level flat-field by dividing each element of said second level noise masks by said corresponding second level scale factor; and (13j) generating a generic normalized second level noise mask by averaging corresponding elements of said normalized second level noise masks.

7. A method of reducing noise in one of a luminance channel and a chrominance channel in an image produced by an image signal source, said method comprising the process of pyramid image representation, followed by the process of a Wiener variant filtering, followed by the process of image restoration, said process of pyramid image representation comprising the steps of:

(14a) performing a forward discrete even cosine transformation (DCT) on first level segments of predefined size of the image to yield first level DCT coefficients for each said first level segment, then storing said first level DCT coefficients in a memory;

(14b) selecting a DC value of each said first level segment and storing said first level DC values in said memory, said first level DC values representing average values for each said first level segment, said first level DC values arranged to form second level segments of said predefined size;

(14c) performing said DCT on said second level segments to yield second level DCT coefficients for each said second level segment, then storing said second level DCT coefficients in said memory;

(14d) selecting a DC value of each said second level segment and storing said second level DC values in said memory, said second level DC values representing average values for each said second level segment, said second level DC values arranged to form third level segments of said predefined size; and (14e) performing said DCT on said third level segments to yield third level DCT coefficients for each said third level segment, then storing said third level DCT coefficients in said memory;

said process of Wiener variant filtering comprising the steps of:

(14f) retrieving both a predetermined generic normalized first level noise mask from said memory and predetermined first level scale factors corresponding to each said first level DC value from said memory;

(14g) generating a first level noise power spectrum for each said first level segment by multiplying said first level scale factors times said generic normalized first level noise mask to produce first products, then squaring said first products;

(14h) generating a first level signal power spectrum for each said first level segment by squaring said first level DCT coefficients of each said first level segment;

(14i) filtering each said first level segment to produce first level filtered segments when providing a first filter product by multiplying a predetermined value $\alpha$ times said first level noise power spectrum, providing a first sum by adding said first level signal power spectrum and said first filter product, providing a first quotient by dividing the first sum into the first level signal power spectrum, and raising the first quotient to the power of a predetermined value $\beta$;

(14j) retrieving both a predetermined normalized second level noise mask from said memory and second level scale factors corresponding to each said second level DC value from said memory;

(14k) generating a second level noise power spectrum for each said second level segment by multiplying said second level scale factors times said generic normalized second level noise mask to produce second products, then squaring said second products;

(14l) generating a second level signal power spectrum for each said second level segment by squaring said second level DCT coefficients of each said second level segment;

(14m) ritering each said second level segment to produce second level filtered segments when providing a second filter product by multiplying the value $\alpha$ times said second level noise power spectrum, providing a second sum by adding said second level signal power spectrum and said second filter product, providing a second quotient by dividing the second sum into the second level signal power spectrum, and raising the second quotient to the power of the value $\beta$;

(14n) retrieving both a predetermined normalized third level noise mask from said memory and third level scale factors corresponding to each said third level DC value from said memory;

(14o) generating a third level noise power spectrum for each said third level segment by multiplying said third level scale factors times said generic normalized third level noise mask to produce third products, then squaring said third products;

(14p) generating a third level signal power spectrum for each said third level segment by squaring said third level DCT coefficients of each said third level segment;

(14q) filtering each said third level segment to produce third level filtered- segments when providing a third filter product by multiplying the value $\alpha$ times said third level noise power spectrum, providing a third sum by adding said third level signal power spectrum and said third filter product, providing a third quotient by dividing the third sum into the third level signal power spectrum, and raising the third quotient to the power of the value $\beta$;

said process of image restoration comprising the steps of:

(14r) performing an inverse discrete even cosine transform (IDCT) on each said third level filtered segment to yield third level IDCT coefficients for each said third level filtered segment;

(14s) retrieving said second level filtered segments and replacing said second level DC values with corresponding said third level IDCT coefficients to form modified second level filtered segments;

(14t) performing an IDCT on each said modified second level filtered segment to yield second level IDCT coefficients for each said modified second level filtered segment;

(14u) retrieving said first level filtered segments and replacing said first level DC values with corresponding said second level IDCT coefficients to form modified first level filtered segments; and (14v) performing an IDCT on each said modified first level filtered segment to yield first level IDCT coefficients for each said modified first level filtered segment, said first level IDCT coefficients representing a noise reduced said one of the luminance channel and the chrominance channel.

8. The method of claim 7, further comprising the step of repeating the method for each said chrominance and luminance channel of said image signal source to produce a noise reduced reconstructed image.

9. A method of reducing noise in an image, comprising the steps of:

(18a) performing a forward discrete even cosine transformation (DCT) on first level segments of predefined size of the image to yield first level DCT coefficients for each said first level segment;

(18b) selecting a DC value of each said first level segment, said first level DC values representing average values for each said first level segment, said first level DC values arranged to form second level segments of said predefined size;

(18c) generating a first level noise power spectrum for each said first level segment by multiplying predetermined first level scale factors times a generic normalized first level noise mask to produce first products, then squaring said first products;

(18d) generating a first level signal power spectrum for each said first level segment by squaring said first level DCT coefficients of each said first level segment;

(18e) filtering each said first level segment to produce first level filtered segments when providing a first filter product by multiplying a predetermined value of times said first level noise power spectrum, providing a first sum by adding said first level signal power spectrum and said first filter product, providing a first quotient by dividing the first sum into the first level signal power spectrum, and raising the first quotient to the power of a predetermined value $\beta$;

(18f) performing said DCT on said second level segments to yield second level DCT coefficients for each said second level segment;

(18g) selecting a DC value of each said second level segment, said second level DC values representing average values for each said second level segment;

(18h) generating a second level noise power spectrum for each said second level segment by multiplying predetermined second level scale factors times a generic normalized second level noise mask to produce second products, then squaring said second products;

(18i) generating a second level signal power spectrum for each said second level segment by squaring said second level DCT coefficients of each said second level segment;

(18j) filtering each said second level segment to produce second level filtered segments when providing a second filter product by multiplying the value $\alpha$ times said second level noise power spectrum, providing a second sum by adding said second level signal power spectrum and said second filter product, providing a second quotient by dividing the second sum into the second level signal power spectrum, and raising the second quotient to the power of the value $\beta$;

(18k) performing an IDCT on each said modified second level filtered segment to yield second level IDCT coefficients for each said modified second level filtered segment;

(18l) replacing said first level DC values with corresponding said second level IDCT coefficients to form modified first level filtered segments; and (18m) performing an IDCT on each said modified first level filtered segment to yield first level IDCT coefficients for each said modified first level filtered segment, said first level DCT coefficients representing a noise reduced said one of the luminance channel and the chrominance channel.

* * * * *